United States Patent [19]

McClure

[11] 4,076,471

[45] Feb. 28, 1978

[54] ROTARY ENGINE WITH SEPARABLE ABUTMENT AND ADJUSTABLE VALVE CAM

[76] Inventor: Troy A. McClure, General Delivery, Los Gatos, Calif. 95030

[21] Appl. No.: 698,187

[22] Filed: Jun. 21, 1976

[51] Int. Cl.$^2$ .......................... F01C 19/00; F01C 1/00; F01C 21/12; F16K 31/524

[52] U.S. Cl. .................................... 418/143; 418/222; 137/624.17

[58] Field of Search ........................ 418/222, 248, 143; 137/624.17

[56] References Cited

U.S. PATENT DOCUMENTS

| | | | |
|---|---|---|---|
| 591,032 | 10/1897 | Cocker | 418/222 |
| 709,323 | 9/1902 | Hodge | 418/246 |
| 865,078 | 9/1907 | Bullard | 418/248 |
| 889,426 | 6/1908 | Arons | 418/222 |
| 914,074 | 3/1909 | Reece | 418/248 |
| 922,604 | 5/1909 | Lemp | 60/670 |
| 1,378,897 | 5/1921 | Peterson | 418/248 |
| 2,050,473 | 8/1936 | Steinmann | 418/248 |

FOREIGN PATENT DOCUMENTS

| | | | |
|---|---|---|---|
| 294,703 | 4/1932 | Italy | 137/624.17 |
| 19,115 | 1901 | United Kingdom | 418/248 |

*Primary Examiner*—John J. Vrablik

*Attorney, Agent, or Firm*—Julian Caplan

[57] ABSTRACT

An engine comprises at least one cylinder and preferably several cylinders side-by-side. Each cylinder comprises a toroidal cylinder and has a piston which revolves around the cylinder. The piston is fixed to the periphery of a disk fixed to the main shaft which coincides with the axis of the cylinder. At one position of the cylinder a gate is installed which seals the cylinder into two sections. On one side of the gate is an inlet port and on the opposite side an exhaust port. A valve controlled by a cam shaft timed from the main shaft controls the inlet port. A gaseous medium is externally heated in a heater and is introduced under pressure through the inlet port and drives the piston around the cylinder; the medium in the cylinder ahead of the piston from the previous cycle is discharged through the exhaust port and cooled and then reheated. The valve is manually (or pedally) controlled to cut off to maintain proper speed for the load on the main shaft. The valve also cuts off intake as the piston approaches the gate. The gate is opened either by contact with the piston or other means and is closed behind the piston.

5 Claims, 10 Drawing Figures

ROTARY ENGINE WITH SEPARABLE ABUTMENT AND ADJUSTABLE VALVE CAM

This invention relates to a new and improved Stirling-type Rankine cycle rotary engine. In the preferred embodiment hereinafter described in detail, there are a plurality of toroidal cylinders formed in a series of engine blocks secured end-to-end, one-half of the torus being formed in each of two adjacent blocks. For each cylinder there is a piston which is attached to the outer periphery of a disk, the disk being fixed for rotation with the main shaft of the engine. The pressure of the medium which drives each piston may be applied for as much as 345° of rotation of the piston and thus the available force is applied on the end of the lever for substantially the entire rotation of the piston. This is one of the principal advantages of the present invention. At less than full power, the intake of gaseous medium into the cylinder behind the piston is cut off at any desired point thereby controlling the output of the engine. Further, one size engine can be controlled to accommodate a wide variety of loads.

A principal feature of the invention is the fact that it is simple in construction and has relatively few moving parts and is light in weight.

The thermal efficiency of the engine is very high, and all of the advantages of the Stirling-type Rankine cycle engine are achieved in the invention hereinafter described. Among these advantages are, in addition to the thermal efficiency, reduction in noise and of air pollution as compared with internal combustion engines. The fuel consumption is relatively low compared with conventional engines.

Still another feature of the invention is the fact that the engine and its parts are subject to less deterioration and wear because the heat is low as compared with internal combustion engines and the speed of rotation is also low.

When the engine is attached to an autoclave vehicle, it is not necessary to employ a transmission. The torque of the invention is the highest at stall.

A major feature of the engine is the fact that all the pressure in the cylinders can be converted to useful work on the main shaft, pressure being used down to line pressure at exhaust. The conventional four-cycle internal combustion engine wastes a substantial part of its pressure out the exhaust. This waste is greatly minimized in the present invention.

Other objects of the present invention will become apparent upon reading the following specification and referring to the accompanying drawings in which similar characters of reference represent corresponding parts in each of the several views.

Figure 1:
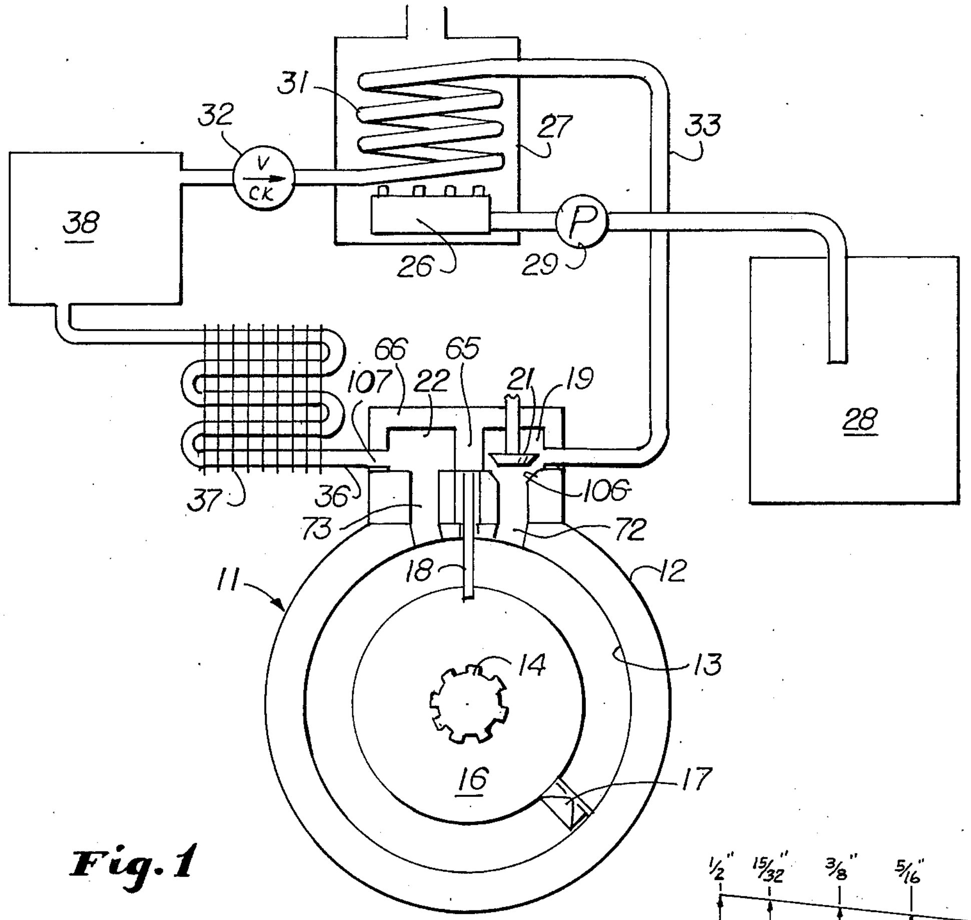
FIG. 1 is a schematic view showing the engine and its associated parts which make up the system.
Figure 8:
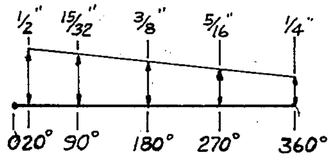
FIG. 8 is a theoretical development of a cam used to control the intake valve of the device.

Directing attention first to FIG. 1, the engine 11 is shown schematically and only one of its multi-cylinders is shown. There is a block 12 formed with a semi-toroidal cylinder 13. The block 12 mates with an adjoining block in which a similar semi-toroidal cylinder 13 has been formed so that when the two are assembled together there is a toroidal cylinder 13. At the axis of the torus is main shaft 14. Turning with the shaft 14 is a disk 16 carrying at its outer rim a piston 17 which, in its cycle of revolution travels around the cylinder 13. At one point in the cycle there is a cylinder main valve 18, hereinafter described in detail, which closes off the cylinder 13 to form two portions, one behind the piston 17 and the other ahead of same. The main valve 18 opens only when the piston 17 is passing therethrough and closes immediately thereafter. On one side of main valve 18 is intake manifold 19 controlled by valve 21. When the valve 21 is opened, a gaseous medium under pressure is admitted to the cylinder 13, driving the piston 17 forward (i.e., clockwise as viewed in FIG. 1). On the side of main valve 18 opposite intake manifold 19 is an exhaust manifold 22 through which the medium in front of the piston 17 is continuously discharged.

An external burner casing 27 is provided and within the casing 27 is a burner 26 which may employ any available fuel. The fuel is stored in tank 28 and is directed to the burner 26 by pump 29. Within the casing 27 is a coil 31 in which the gaseous medium is heated to increase its pressure and specific heat. Valve 32 prevents the backward flow of gaseous medium from the coil 31. The exhaust gases flow out of manifold 22 through an exhaust conduit 36 to a condenser, cooler, or radiator 37 where the heat is reduced and the cooled medium is stored in a reservoir tank 38 for recirculation through the coil 31.

The foregoing is a Stirling-cycle engine in that the heated gaseous medium drives a piston and the gaseous medium from the previous cycle of rotation is exhausted and condensed or at least cooled before being reheated and recycled. The combustion in burner 26 is external to the engine 11 and hence a more complete, efficient, pollution-free combustion is achieved. The gaseous medium may be of various gases and vapors including air, hydrogen, helium, steam, Freon, etc.

Figure 4:
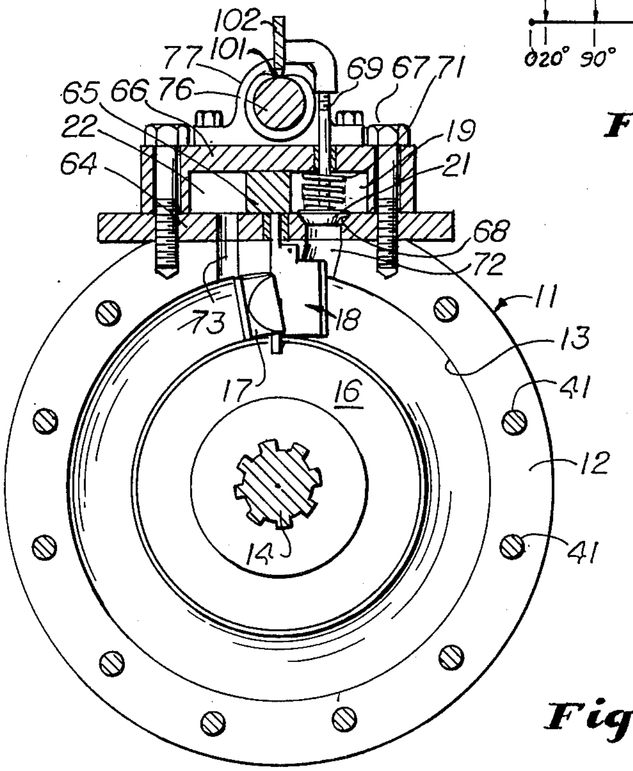
FIG. 4 is a transverse sectional view taken substantially along the line 4—4 of FIG. 3.
Figure 2:
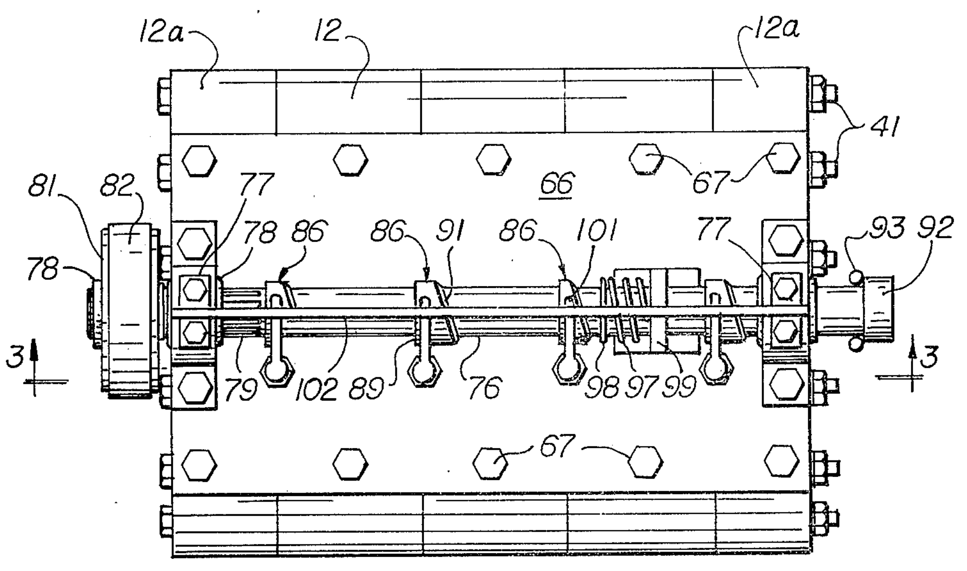
FIG. 2 is a top plan.
Figure 3:
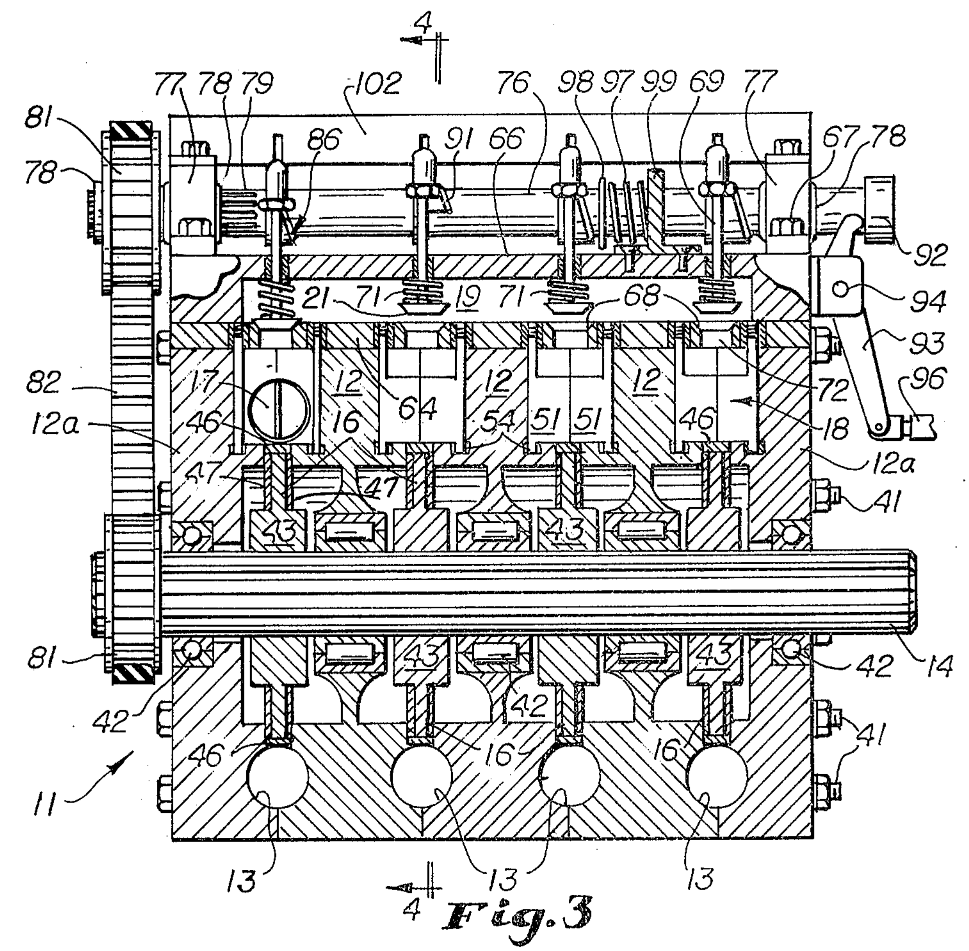
FIG. 3 is a vertical sectional view taken substantially along the line 3—3 of FIG. 2.

Directing attention now to the details of engine 11, and with specific reference to FIGS. 2, 3 and 4, the engine block 12 intermediate to the ends of engine 11 are substantially identical and the two end blocks **12*a* are complementary. As is apparent from FIG. 3, the semi-toroidal cylinders formed in each block and in each face of each intermediate block 12 are assembled side-by-side and held together by bolts 41 which pass through all of the blocks to form four cylinders 13. It will be understood that one or more cylinders may be employed depending upon the desired capacity of the engine. Suitable bearings 42 in the blocks 12, 12*a* support shaft 14 for rotation, the shaft 14 preferably being splined. Each disk 16 has a hub 43 which turns with the shaft 14. On the outside of each disk 16** is a belt-shaped seal ring 46. To complete the seal of belt 46, a pair of annular belt seals or shoulders 47 is employed, the same being recessed into the blocks 12, 12*a* immediately inside the belts 46. The shoulders 47 are held in place by screws (not shown) or other means so that the shoulders 47 as well as the belts 46 may be replaced for wear as required.

The belt seal 46 turns with disk 16, and for such purpose there is a substantially radial attachment 48 which secures the belt 46 to the piston 17. A vent 49 is formed in the belt 46 to equalize the pressure when the main cylinder valve 18 is about to open so as to minimize the force of the main valve opening.

Figures 5, 6, 7, 9, 10:
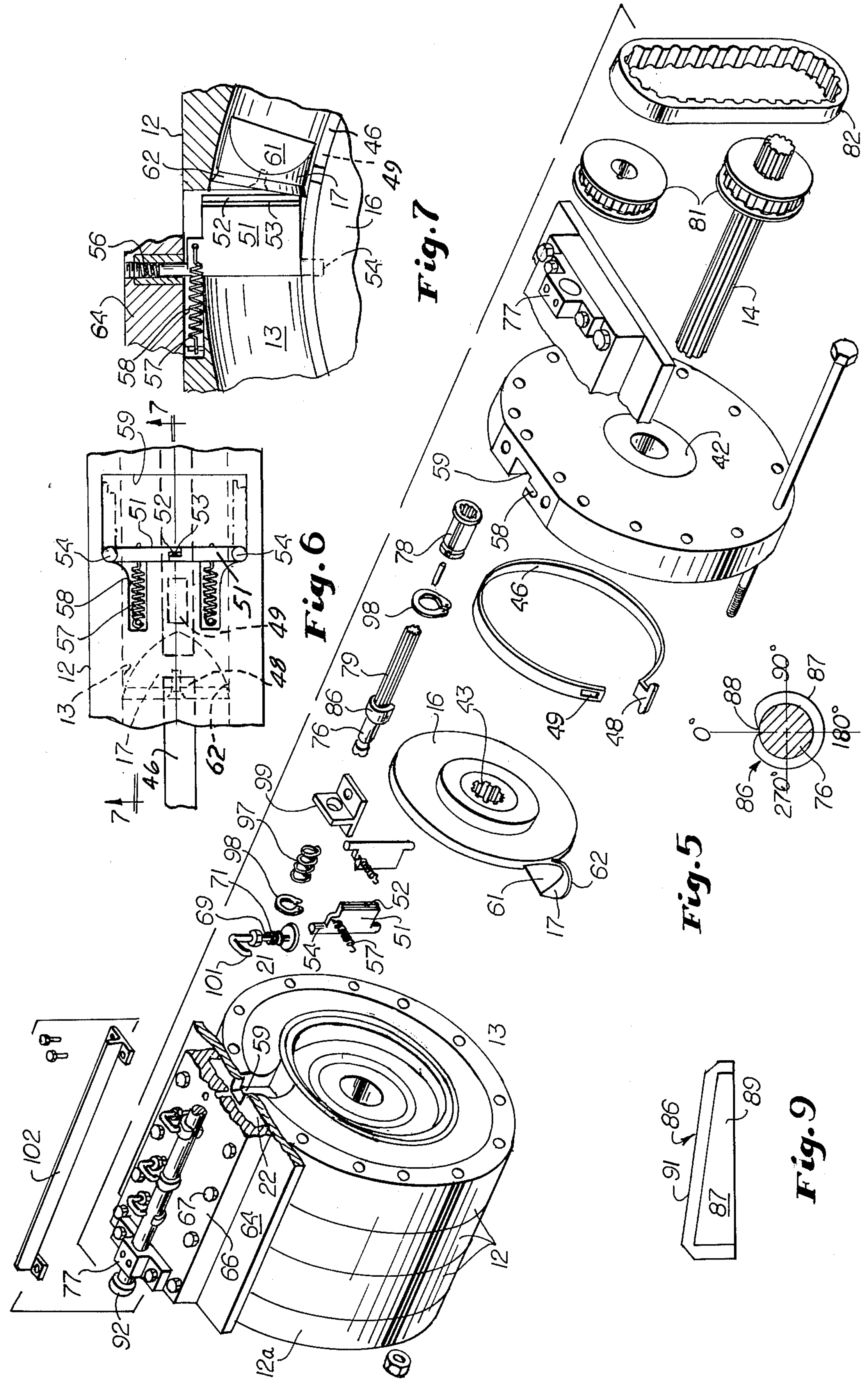
FIG. 5 is an exploded perspective view with some of the parts being shown in different scale than other parts.
FIG. 6 is an enlarged fragmentary top plan view showing the main cylinder valves.
FIG. 7 is a fragmentary sectional view taken substantially along the line 7—7 of FIG. 6 and showing the piston at a different point in its cycle.
FIG. 9 is a schematic projection onto a flat plane of the shape of the cam controlling the intake valve.
FIG. 10 is a schematic cross sectional view through the cam shaft.

The main valve 18 is opened as the piston 17 passes there-through. Various means may be used to time the opening of main valve 18 but a simple means is herein illustrated. In this embodiment, it is the motion of the piston 17 itself which opens the main valve. For this purpose, the valve 18 consists of two gate members 51 which are pivoted for opposite movement in the blocks 12 or 12*a*. The inner edges of gates 51 are formed with rabbets 52 so that they overlap and there is a gate seal 53 along one or both of the rabbetts 52. The gates 51 pivot on pintles 54 at the top and bottom, being rotatably mounted in the blocks 12, 12*a*. A helical spring 56 biases the upper pintles 54 downwardly to keep the lower edges of the gates 51 in contact with the belt seal 46 and walls of cylinders 13. Return springs 57 hold the gates 51 closed, said springs 57 being received in recesses 58. The blocks 12, 12*a* are formed with openings 59 to permit the gates to swing open from solid line to dotted line position, as best shown in FIG. 6. The forward nose 61 of piston 17 is round and the piston is provided with a chevron seal 62. The nose 61 of the piston pushes the gates open and the springs 57 return same to closed position.

The tops of the blocks 12, 12*a* are formed with horizontal flats to which is bolted a valve plate 64 extending across all of the blocks. Above plate 64 is a valve chest 66 in which the intake and exhaust manifolds 19, 22 are formed with partition 65 therebetween. Bolts 67 hold down the chest 66. In plate 64 are valve seats 68. The valve stems 69 extend upward from valves 21 and are biased to seat on the seats 68 by valve springs 71 surrounding the stems 69 and bearing against the underside of chest 66. Thus there is an inlet port 72 between inlet valve seat 68 and cylinder 13 to one side of the main cylinder valve 18 and an exhaust port 73 communicating from the cylinder 13 to the exhaust manifold 22.

Rotatable in timed relation to shaft 14 is a cam shaft 76 mounted by means of pillow blocks 77 and sleeves 78 on shaft 76 and bolted to the top of chest 66. The left-hand end of shaft 76 (as viewed in FIGS. 2 and 3) is formed with a splined section 79. Pulleys 81 are mounted on shafts 76 and 14 and interconnected by a belt 82. Upper pulley 81 is fixed to sleeve 78 by a key on other means.

For each of the cylinders 13 there is a cam 86 mounted on shaft 76 and the location of the cam 86 determines the timing of the various cylinders which is preferably a 1-3-4-2 cycle. The development of each cam is best shown in FIGS. 9 and 10. In the form of cam shown in FIG. 10 there is a high dwell 87 which extends around most of the circumference of cam shaft 76 and a low dwell 88 for about 20°. The low dwell 88 insures that the valve 21 is closed as the piston 17 passes through the cylinder main valve 18. As best shown in FIG. 9, one edge 89 of the cam high dwell 86 is straight while the other edge 91 is slanted and beveled. As hereinafter appears, the cams 86 are movable axially with the shaft 76 and the position which they have at any instant determines how long the valve 21 is opened.

To move the cams 86 (and their shaft 76) axially, one end of shaft 76 is formed with a collar 92 against which bears a clevis type lever 93 mounted in bracket 94 on one of the end blocks 12*a*. Rod 96 extends to a hand or foot control which governs the speed of the engine. By pushing the rod 96 to the left, as viewed in FIGS. 2 and 3, the shaft 76 is pulled to the right, pulling the cams 86 therewith. The shaft 76 is returned by means of return spring 97 which surrounds the shaft 76. One end of the spring 97 bears on a collar 98 attached to shaft 76 and the other bears against a stationary abutment 99 fixed to chest 66.

For each valve 21 there is a cam follower 101 attached to the upper end of valve stem 69. The follower 101 is held in place by a hold-down 102 bolted to pillow blocks 77. Thus the follower 101 follows the high and low dwells of cams 86. As viewed in FIGS. 2 and 3, the farther the shaft 76 is to the right, the longer the followers 101 are in engagement with the high dwell 87 of the cams and the longer the valves 21 are opened. Thus by means of rod 96 the engine is controlled in the sense that gaseous fluid is admitted to each cylinder 13 behind piston 17 for a short or longer portion of the cycle of rotation of the piston depending upon the portion of the cycle when follower 101 is in engagement with the high dwell 87 of cam 86.

OPERATION

A gaseous medium is installed in the lines and cavities of the system up to hundreds of atmospheres pressure. Then burner 26 is ignited and heats the gaseous medium in coil 31 causing the multiplied pressure of the medium to pass to the intake manifold 19 thru intake port 72 and thence for a portion of the cycle of rotation of the engine into the cylinder 13, driving the piston 17 before it and thus causing the disk 16 to rotate the shaft 14. The main valve 18 is, of course, closed during all of the power stroke of the piston 17. The spent gases from the previous cycle are discharged through exhaust port 73 into manifold 22 and thence to cooler or condenser 37 where the gas is cooled and condensed and returned to supply tank 38 to begin another cycle.

As the piston 17 passes through the main valve 18, it swings the gates 51 in FIG. 5 about their pintles 54 to open position; but as soon as the piston 17 has passed the main valve 18, the springs 57 return the gates 51 to closed position. It will be understood that the gates 51 may be controlled by other means.

Speed control is achieved manually or pedally by moving the rod 96 in FIG. 3 causing the clevis lever 93 to move the shaft 76 to the right and the spring 97 to return it toward the left. Depending upon the position of shaft 76, the cam follower 101 comes into engagement with the high dwell of the cam 86 and more particularly its slanted edge 91 and this raises the valve 21 against the force of spring 71 which tends to return it. When the follower 101 engages the low dwell 88, the valve 21 is closed. The valve 21 is always closed as the piston 17 passes through the main valve 18. Further, to equalize pressure on both sides of main valve 18, the pressure in cylinder 13 leaks through vent 49 in seal 46, going under main valve 18 to exhaust port 73 as viewed in FIGS. 4 and 5.

What is claimed is:

1. An engine comprising means forming a toroidal cylinder, a main shaft at the axis of said cylinder, a piston rotatable in said cylinder, means for turning said piston and main shaft together, a main valve in said cylinder, an intake port on one side of said main valve, an outlet port on the side of said main valve opposite said intake port and means for supplying gas under pressure to said intake port, an intake valve controlling said means for supplying gas, a cam shaft having a cam, means rotatably mounting said cam shaft on said engine for axial movement and rotative movement, means driving said cam shaft in time relation to said main shaft, means for adjusting the longitudinal position of said cam shaft, a cam follower, means articulately connecting said cam follower to said intake valve, each said cam having a high dwell with a ramp configuration such that the extent of opening of said intake vavle varies in an axial direction, whereby as said cam shaft is moved longitudinally the duration of opening of said inlet valve is adjusted.

2. An engine comprising a block formed with a toroidal cylinder, a main shaft rotatable at the axis of said cylinder, a disk-like member fixed for rotation with said main shaft, a piston on the periphery of said disk-like member rotatable about said cylinder, said block formed with a slot for passage of said disk-like member, seal means sealing said cylinder against leakage through said slot, a main valve in said cylinder, actuating means to permit opening of said main vavle for passage of said piston therethrough and to close said main valve after passage of said piston, means forming an inlet port to said cylinder on a first side of said main valve, means forming an outlet port to said cylinder on a second side of said main valve opposite said first side, means supplying gas under pressure to said inlet port, an intake valve controlling admission of said gas to said cylinder behind said piston to drive said piston around said cylinder, a cam shaft driven in timed relation to said main shaft, a cam on said shaft, a cam follower, means articulately connecting said cam follower and said intake valve, said cam having a high dwell with a ramp configuration and means for relatively moving said ramp configuration and said cam follower to time the duration of opening of said intake valve, said ramp configuration being such that the extent of the high dwell varies in an axial direction so that said follower is lifted varying time intervals as said ramp is moved axially relative to the follower.

3. An engine comprising a block formed with a toroidal cylinder, a main shaft rotatable at the axis of said cylinder, a disk-like member fixed for rotation with said main shaft, a piston on the periphery of said disk-like member rotatable about said cylinder, said block formed with a slot for passage of said disk-like member, seal means sealing said cylinder against leakage through said slot, a main valve in said cylinder, actuating means to permit opening of said main valve for passage of said piston therethrough and to close said main valve after passage of said piston, means forming an inlet port to said cylinder on a first side of said main valve, means forming an outlet port to said cylinder on a second side of said main valve opposite said first side, means supplying gas under pressure to said inlet port, and an intake valve controlling admission of said gas to said cylinder behind said piston to drive said piston around said cylinder, said seal means comprising a belt fixed to said disk-like member on the periphery of said disk-like member, said belt being wider than the thickness of said disk-like member, said block being recessed for movement of said belt, and disk-like replaceable belt shoulders fixed non rotatively to said block immediately inside said belt, one on each side of said disk-like member, said belt sealing against said shoulders.

4. An engine according to claim 3 in which said belt is formed with a vent under said piston to equalize pressure before said piston passes through said main valve.

5. An engine comprising a block formed with a toroidal cylinder, a main shaft rotatable at the axis of said cylinder, a disk-like member fixed for rotation with said main shaft, a piston on the periphery of said disk-like member rotatable about said cylinder, said block formed with a slot for passage of said disk-like member, seal means sealing said cylinder against leakage through said slot, a pair of gates having pintles at top and bottom of a first edge of each said gate, first resilient means biasing said gates to closed position extending transversely of said cylinder, second edges of said gates opposite said first edges in closed position meeting in the center of said cylinder to close off gas flow through said main valve, means forming an inlet port to said cylinder on a first side of said main valve, means forming an outlet port to said cylinder on a second side of said main valve opposite said first side, means supplying gas under pressure to said inlet port, an intake valve controlling admission of said gas to said cylinder behind said piston to drive said piston around said cylinder, a valve chest fixed to the exterior of said block vicinal said main valve and having an inlet and an outlet manifold communicating with said inlet and outlet ports respectively, a valve seat formed in said valve chest, said intake valve seating on said valve seat, one said pintle being journaled in said valve chest, second resilient means biasing said gates away from said valve chest and against the wall of said cylinder opposite said valve chest to seal said cylinder at said main valve, said piston having a wedge-shaped nose shaped to force said gates open upon contact of said nose with said gates.

* * * * *